United States Patent
Shillinger et al.

(12)

(10) Patent No.: US 11,674,528 B2
(45) Date of Patent: Jun. 13, 2023

(54) GAS COMPRESSOR WITH EDUCTOR ASSEMBLY

(71) Applicant: Carnot Compression Inc., Reno, NV (US)

(72) Inventors: Danil Hans Shillinger, Nevada City, CA (US); Christopher David Finley, Reno, NV (US); Christophe Duchateau, Reno, NV (US)

(73) Assignee: CARNOT COMPRESSION INC., Reno, NV (US)

( * ) Notice: Subject to any disclaimer, the term of this patent is extended or adjusted under 35 U.S.C. 154(b) by 354 days.

(21) Appl. No.: 17/013,460

(22) Filed: Sep. 4, 2020

(65) Prior Publication Data

US 2021/0071687 A1    Mar. 11, 2021

Related U.S. Application Data

(60) Provisional application No. 62/896,849, filed on Sep. 6, 2019.

(51) Int. Cl.

| F04F 1/18 | (2006.01) |
|---|---|
| F04F 5/54 | (2006.01) |
| F04F 13/00 | (2009.01) |
| B01D 19/00 | (2006.01) |

(52) U.S. Cl.
CPC ............ *F04F 1/18* (2013.01); *B01D 19/0042* (2013.01); *F04F 5/54* (2013.01); *F04F 13/00* (2013.01); *F05D 2210/132* (2013.01)

(58) Field of Classification Search
CPC ...... F04F 1/18; F04F 5/54; F04F 13/00; F05D 2210/132; B01D 19/0042
See application file for complete search history.

(56) References Cited

U.S. PATENT DOCUMENTS

| 928,775 | A | * | 7/1909 | Mathis |
|---|---|---|---|---|
| 2,260,600 | A | | 10/1941 | Clark |
| 3,240,003 | A | | 3/1966 | Stroup et al. |
| 4,027,993 | A | | 6/1977 | Wolff |
| 4,626,176 | A | | 12/1986 | Cole |
| 6,713,028 | B1 | | 3/2004 | Oklejas, Jr. |
| 11,209,023 | B2 | * | 12/2021 | Duchateau ........... H02K 7/1823 |

(Continued)

OTHER PUBLICATIONS

European Patent Application No. 20861271.3; Extended Search Report; dated Aug. 25, 2022; 8 pages.

(Continued)

*Primary Examiner* — Charles G Freay
(74) *Attorney, Agent, or Firm* — BakerHostetler

(57) ABSTRACT

A gas compressor comprising a substantially hollow cylindrical drum secured to a fixed shaft and configured to rotate a volume of fluid about a central axis. A plurality of eductors may be affixed to the shaft through support rods and positioned within an interior of the drum to receive a flow of fluid during rotation of the drum. A gas inlet along the fixed shaft comprises a channel through which gas external to the drum may be drawn into the eductors and compressed. Compressed gas accumulates within a central area of the drum and may be harvested through a gas outlet along the fixed shaft. Additional embodiments may comprise pitot tubes to manage a fluid level within the drum, and a cooling system to manage fluid temperature.

23 Claims, 8 Drawing Sheets

(56) References Cited

U.S. PATENT DOCUMENTS

2010/0270223 A1    10/2010   Arnaud
2015/0023807 A1     1/2015   Cherry et al.
2020/0277970 A1     9/2020   Duchateau et al.

OTHER PUBLICATIONS

International Patent Application No. PCT/US2020/049576; Int'l Search Report and the Written Opinion; dated Feb. 2, 2021; 15 pages.
International Patent Application No. PCT/US2020/049576; Int'l Preliminary Report on Patentability; dated Mar. 17, 2022; 8 pages.

\* cited by examiner

GAS COMPRESSOR WITH EDUCTOR ASSEMBLY

CROSS REFERENCE TO RELATED APPLICATIONS

This application claims benefit under 35 U.S.C. § 119(e) of Provisional U.S. Patent Application No. 62/896,849, filed Sep. 6, 2019, the contents of which is incorporated herein by reference in its entirety.

TECHNICAL FIELD

Gas compression systems, and more particularly, internal recirculating centrifugal gas compression systems.

BACKGROUND

In a traditional centrifugal gas compression system, fluid and gas are moved from an inner area to an outer area of a rotating drum through channels of some type, typically tubes. As the liquid and gas move in this manner the gas is compressed and separated from the liquid as it reaches the outer area.

SUMMARY

A gas compressor comprising a substantially hollow cylindrical drum having a first end and second end opposite the first end, and a substantially hollow shaft secured to the first and second ends of the drum. The drum holds a volume of fluid and may be configured to rotate around the fixed shaft. During rotation, the fluid volume forms an annular lake due to centrifugal forces, and the fluid is at a first level from the interior walls of the drum.

An eductor assembly comprises a plurality of eductors secured to the fixed shaft through an eductor support rod positioned substantially orthogonally to the fluid flow. The eductors are positioned within the drum within the annular lake and configured to receive a flow of fluid. The fluid velocity creates a suction that draws air into a channel formed along the fixed shaft between an air inlet and the eductors. The gas mixes with the fluid within the eductor and becomes compressed. Upon exiting the eductors, the gas and liquid separate, with the liquid rejoining the annular lake and the gas accumulating in a central portion of the drum. A gas outlet harvests the compressed gas and removes it from the drum.

A plurality of pitot tubes may be included in the drum to manage the volume of fluid within the drum. Removed fluid may also be cooled and reintroduced to the drum to manage temperature. In various embodiments the fluid may be water and the gas may be air, but other fluids and gases are equally applicable.

In embodiments, the eductors may be linear or non-linear to optimize fluid flow. The eductors may have a curved and/or streamlined external body to reduce external drag. In some embodiments, a frontal inlet of the eductor is not parallel to a plane defined by an outlet of the eductor.

In embodiments, the eductors may be located mostly or entirely in the central portion of the drum and (where necessary) fed pressurized liquid via a pitot tube or similar system configured to harvest liquid from the annular lake.

BRIEF DESCRIPTION OF THE DRAWINGS

The drawings are provided to illustrate example embodiments described herein and are not intended to limit the scope of the disclosure.

DETAILED DESCRIPTION OF ILLUSTRATIVE EMBODIMENTS

Figure 1:
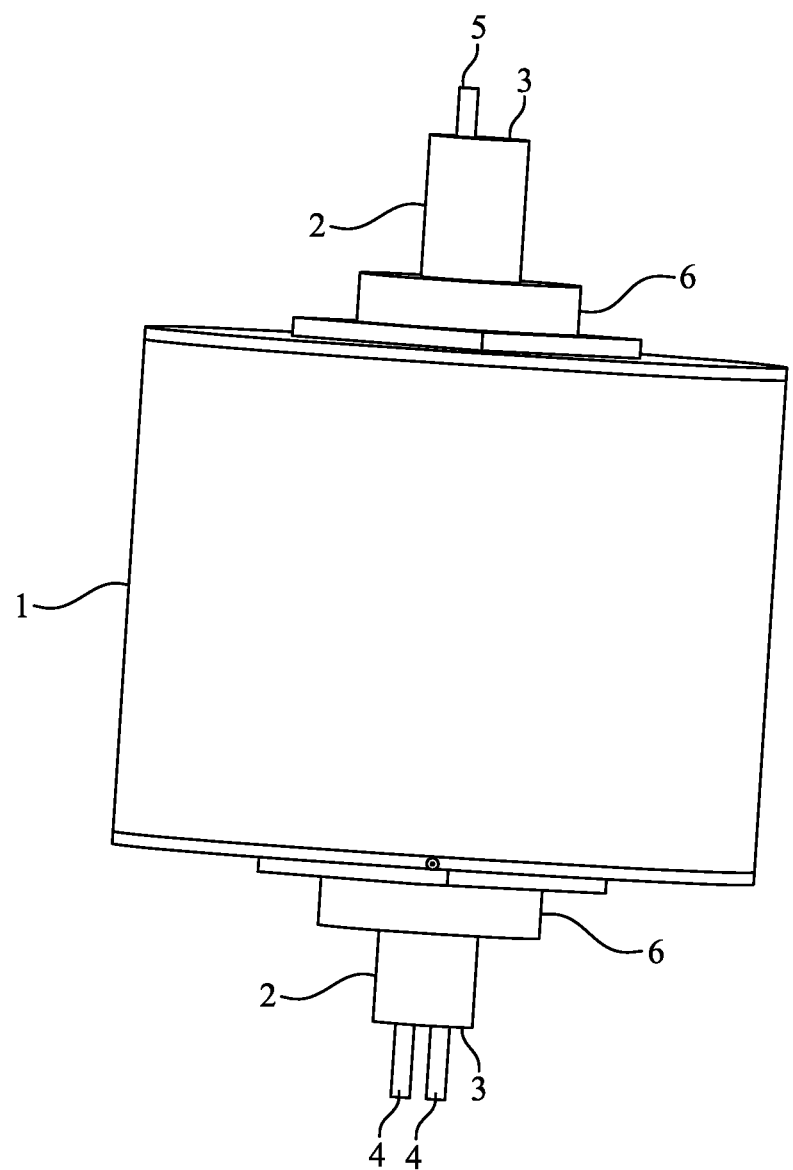
FIG. 1 is an external view of a compressor assembly in accordance with an embodiment.

Devices, systems, and methods are described herein for compressing gas through centrifugal action of a compressor drum containing a liquid and a gas. FIG. 1 illustrates an exterior view of a compressor assembly, comprising a compressor drum 1, which may be rotatable around a fixed shaft assembly 2. Bearings 6 and seals 11 (shown in FIG. 2) may be used to connect the drum and the fixed shaft assembly, while allowing the drum 1 to freely rotate around the shaft 2.

One or more inlets 3 may be positioned on the fixed shaft 2 and may allow gas and/or fluid to enter the compressor drum 1. One or more outlets 4 and 5 may be positioned along the fixed shaft on an opposite end of the drum and may allow air and/or fluid to exit. In embodiments, liquid can also be introduced through inlet 3, which can double as gas inlet. Inlets 3 may be located on one or both sides of the compressor drum 1. One or more fluid outlets 4 may also be located along the fixed shaft. In embodiments, the fluid outlets may be connected to one or more pitot tubes 10 (shown in FIG. 2) located inside the drum, which assist in maintaining a desired fluid level, as further described below. A gas outlet 5 may connect to a central portion of the compressor drum to remove the compressed gas once it reaches a desired pressure.

Figure 2:
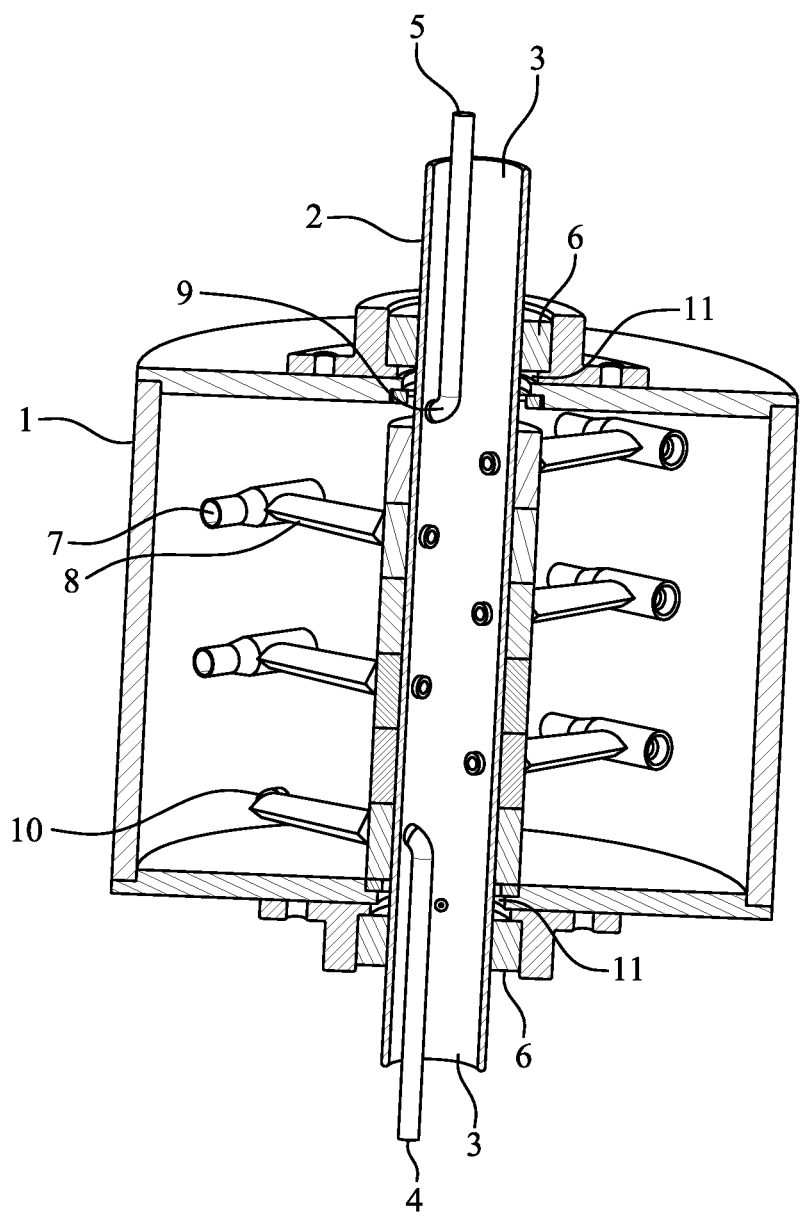
FIG. 2 is a cross-sectional view of a compressor assembly in accordance with an embodiment.

FIG. 2 illustrates at least a portion of the interior of the compressor drum 1 and the fixed shaft 2. The fixed shaft runs along a central axis of the compressor drum and comprises the stator complex including an eductor assembly of the eductors 7 and eductor support rods 8, as well as gas and fluid inlets 3, a compressed gas outlet 5, and liquid outlet 4. A seal 11, such as a rotary seal, may be provided around the fixed shaft, between a top or bottom wall of the compressor drum, to ensure that undesired and unintentional fluids and gases do not enter or exit the compressor drum. One or more bearings 6 may be included to secure the shaft to the compressor drum and enable smooth rotation of the drum about the shaft and stator complex. In embodiments, the rotating compressor drum 1 may be turned by a drive system (not shown).

The interior of the fixed shaft may be substantially hollow, and comprise one or more holes, tubing, and pathways to an interior of the compressor drum 1. For example, the compressed gas outlet 5 may run along an interior section of the fixed shaft 2 to provide a pathway to the compressor drum's interior. One or more compressed gas pathways may comprise holes 9 arranged on an outer portion of the fixed shaft to draw in compressed gas within the drum 1 and transport the gas to an external area for use or storage. Similarly, one or more liquid outlets 4 can comprise tubing running along the interior of the fixed shaft and connect at least one pitot tube 10 within the compressor drum to an external area. The liquid outlets, as further discussed below, can assist in maintaining water levels to desired level and enable implementation of a cooling system.

FIG. 2 further illustrates a plurality of eductors 7 distributed throughout the interior of the drum 1, each secured to a support rod 8 running along a length of the fixed shaft 2. The eductors may be arranged perpendicular to the fixed shaft 2 and configured to remain stationary—like the fixed shaft 2—to receive a continuous flow of fluid during rotation of the compressor drum. The support rods 8 orthogonally connect to the eductors and provide a hollow pathway between a narrowed section of the eductors (further described below) and the interior of the fixed shaft. As the fluid moves through the rotating compressor drum, see, e.g., (D) in FIG. 3B, a pressure differential is created, causing a suction within the gas inlets 3. A supply of gas located external to the drum may be introduced at inlets 3, so that the gas may be drawn along the fixed shaft 2 and support rod 8, into an eductor 7, and mixed with the fluid traveling through the eductor. Upon exiting the eductor, the liquid and gas mixture separates, with the liquid collecting along the drum's interior wall, and the gas accumulating in the central portion. From there, the compressed gas may be drawn into an outlet hole 9, and through a compressed gas outlet 5 along the fixed shaft, to be harvested for one or more applications.

One or more pitot tubes may be provided within the compressor drum to assist in maintaining or adjusting the fluid level to a desired amount. For example, the pitot tubes may make it possible to remove fluid once the eductors are fully submerged. Similarly, the pitot tubes can indicate when a fluid level is too high or too low and provide information regarding the pressure within the compressor drum.

It will be appreciated that the number, position, and orientation of the eductors and pitot tubes can vary depending on one or more considerations, including but not limited to a size, shape, or number of eductors, the water flow path during rotation of the compressor drum, potential interference between neighboring eductors, and other cooling, cost, efficiency, and manufacturing considerations.

Figure 3A:
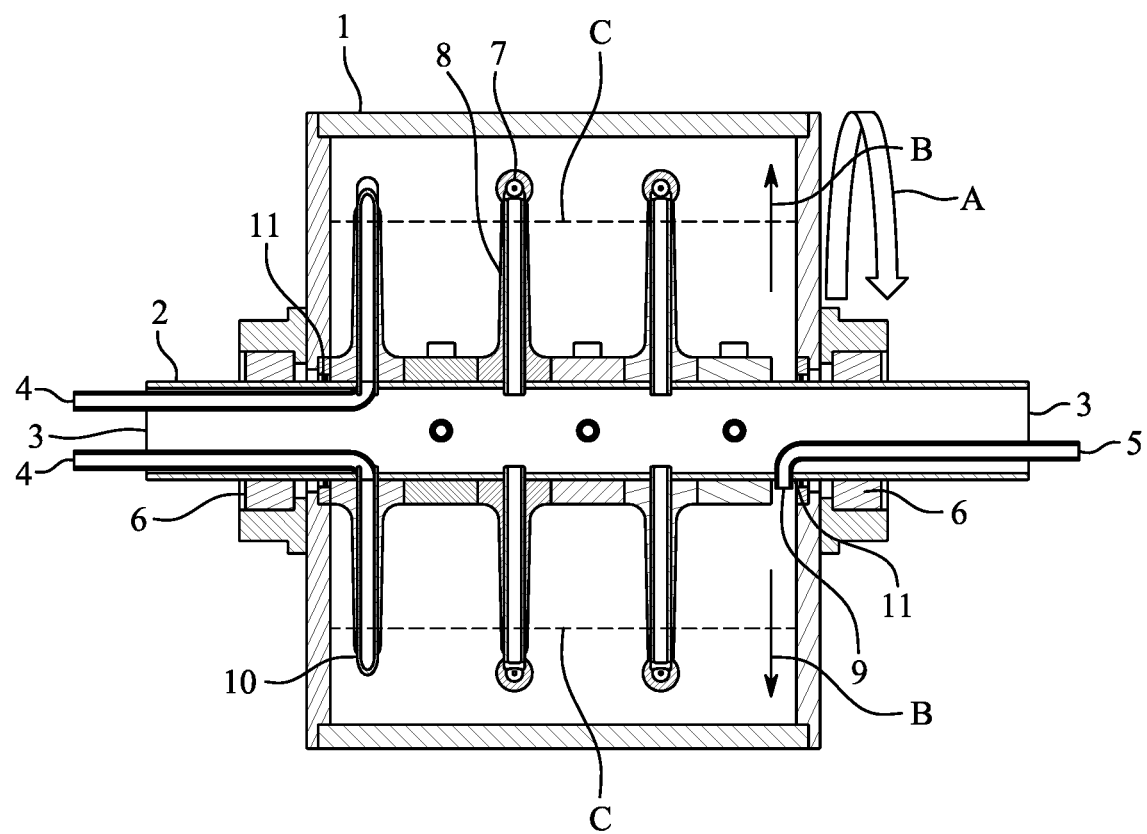
FIG. 3A is a length-wise cross-sectional view of a compressor assembly during a compression operation in accordance with an embodiment.
Figure 3B:
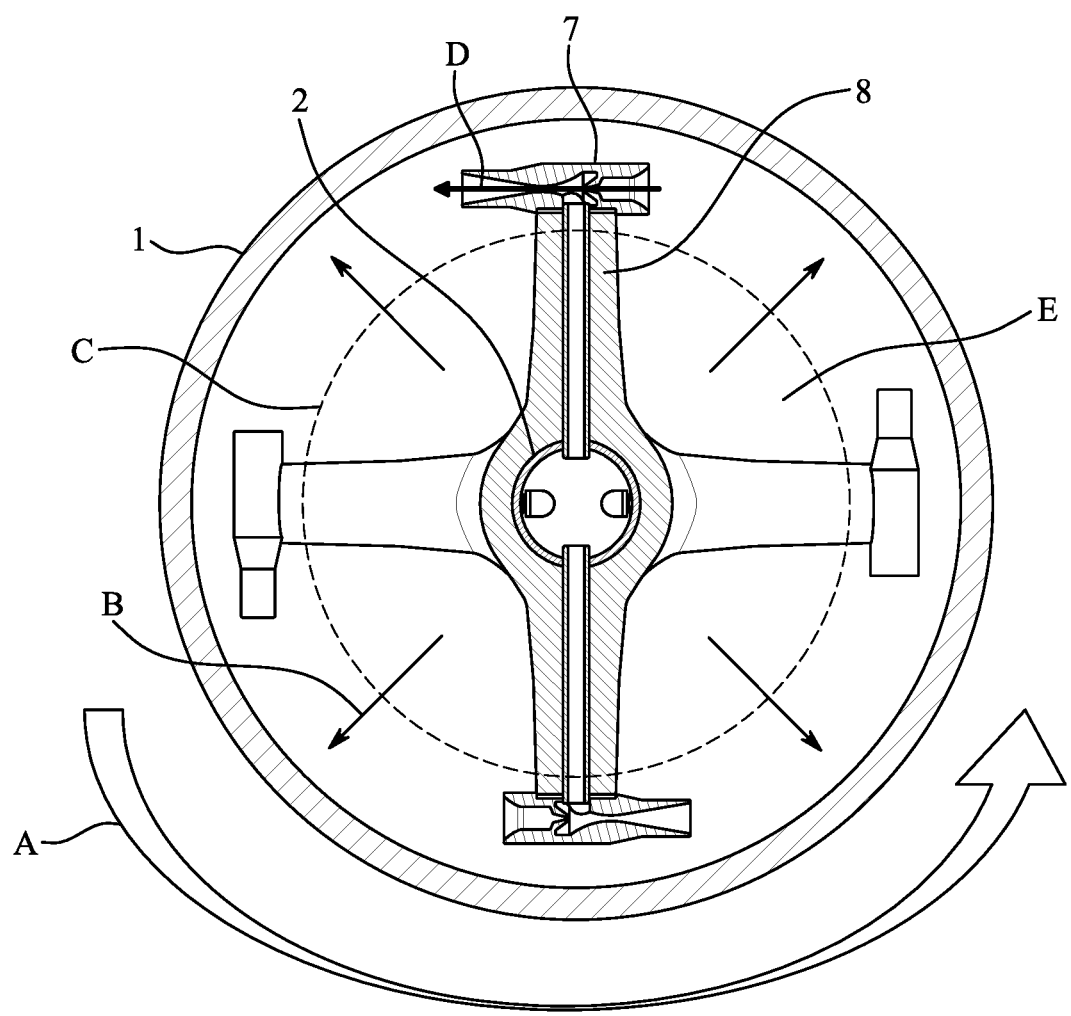
FIG. 3B is a cross-sectional view of eductors within a compressor assembly in accordance with an embodiment.
Figure 3C:
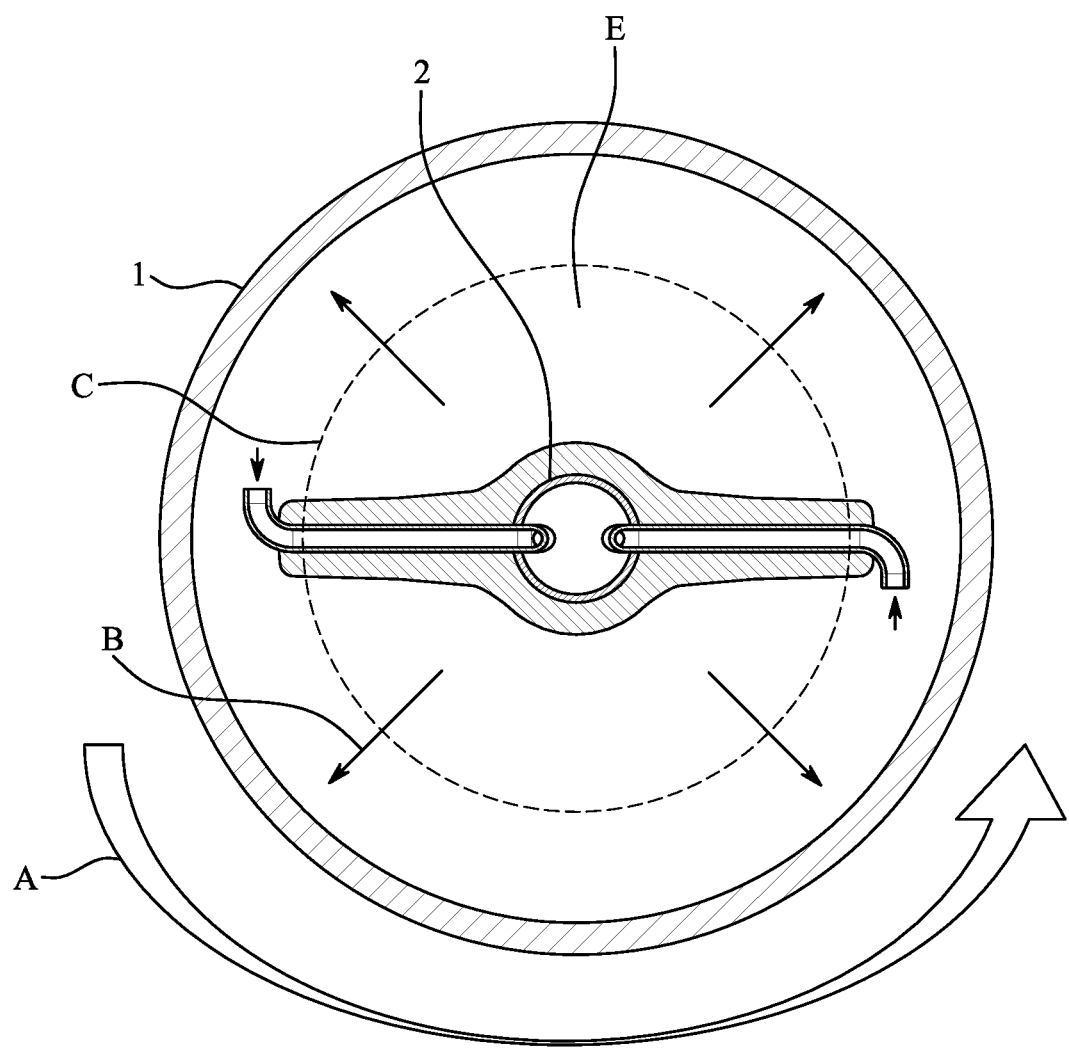
FIG. 3C is a cross-sectional view of pitot tubes within a compressor assembly in accordance with an embodiment.

FIGS. 3A, 3B and 3C illustrate the operation of the compressor. Fluid may be introduced through one or more inlets 3. When the compressor has been partially filled with fluid, the compressor drum 1 may be rotated in the direction of rotation (A) by a drive assembly (not shown to simplify the Figure). The rotation of the compressor drum 1 forces the fluid against an interior wall of the drum due to centrifugal forces (B) and forms an annular lake against the interior wall. The fluid level during rotation may be represented by (C), with the annular lake filling the area between the dotted fluid line and the interior wall of the compressor drum.

In embodiments, the level of fluid (C) within the drum may be adjusted such that the eductors are fully submerged during rotation of the drum 1. The fluid level (C) can, as an example, be increased during operation by injecting and/or spraying fluid into one or more air inlets 3 and decreased by removing liquid through the pitot tubes 10. The fluid level may be automatically adjusted through a control system and one or more sensors (both not shown) measuring characteristics of the gas compression operation.

FIG. 3B depicts how the rotation of the drum (A) creates a flow of fluid through the stationary eductors. In embodiments, the rotation may force the fluid at level (C), which may be enough to fully submerge each of the eductors 7, through the eductors. In embodiments, the eductors may not be fully submerged, but rather only have inlets dipped into the annular lake. In embodiments, the eductors may be fully removed from the annular lake and be fed by tubes, such as pitot tubes, that harvest pressurized liquid from the annular lake. The fluid flow may create a continuous fluid stream (D) through the stationary eductors. The eductors may be designed to take advantage of the Venturi Effect, wherein the flow of liquid through the eductor creates a pressure differential along the length of the eductor. Specifically, the fluid flow at a tapered, narrow region of the eductors has a lower pressure than the wider portions of the flow path, e.g., the eductor inlet and outlet. The lower pressure region creates a suction within the orthogonally connected eductor support rods 8 and draws gas into the eductors through the channel formed between the gas inlets 3, fixed shaft 2, and support rods 8. The gas may be compressed to a first pressure within the eductors, due to mixing with the fluid, and exits the eductors into the interior of the compressor drum 1.

Upon exiting the eductors, the gas and liquid become separated, due to centrifugal forces and differing densities between the gas and liquid. The denser liquid gets forced towards the interior wall of the rotating drum, where it may rejoin the annular lake, while the gas accumulates in the central portion of the chamber, represented by area (E). As the amount of gas increases in the central portion (E), the pressure within the drum increases and further compresses the gas. Gas can continue being introduced until a desired pressure is reached, at which point the compressed gas may be harvested through the compressed air outlet 5.

During the compression operation, the gases experience a nearly isothermal compression, as the liquid absorbs the corresponding heat of compression from the gas. This results in an increased temperature of the liquid. As liquid flows through and around the eductors, the friction produces additional heat, which is also absorbed by the fluid and further increases its temperature. To limit the operating temperature of the compression system, a portion of the heated liquid in the annular lake may be drawn out of the compressor drum 1 through one or more pitot tubes 10, and colder liquid can be introduced, e.g., injected or sprayed into the air inlets 3. In embodiments, the heated liquid may be directed to a cooling loop and reintroduced into the compressor drum.

FIG. 3C depicts a cross-sectional, bottom view of the compressor drum 1, and illustrates a flow of fluid through a pair of pitot tubes 10 extending from the fixed shaft 2 into the annular lake area. The pitot tubes may be arranged so as to receive and remove fluid to adjust the level of fluid within the compressor drum. In an example, the pitot tubes can be configured to remove fluid from the annular lake when a certain pressure or fluid level (C) is reached. In another example, measurements from the pitot tubes may indicate when fluid should be added to the compressor drum.

Figure 4:
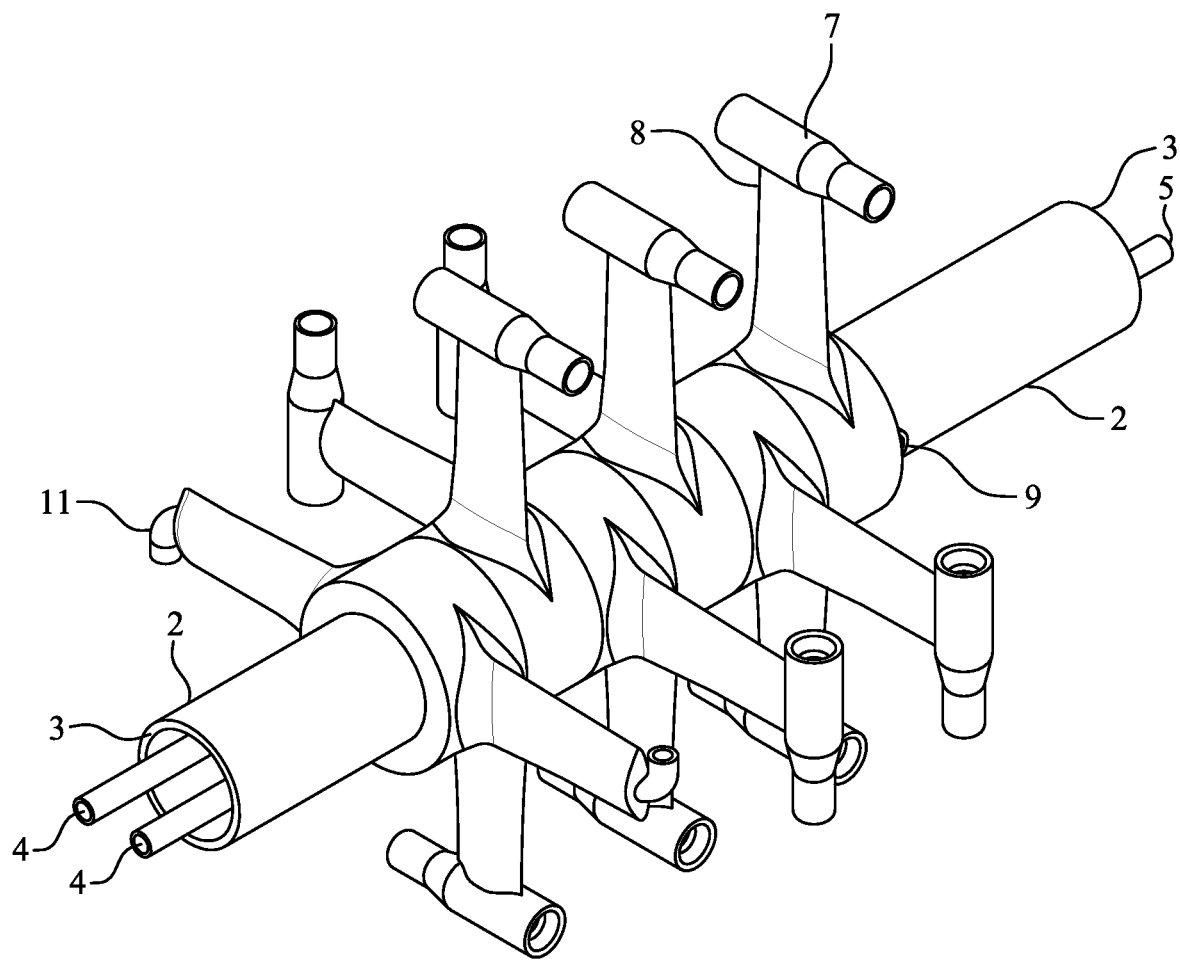
FIG. 4 is a stator complex in accordance with an embodiment.

FIG. 4 illustrates a stator complex in accordance with one or more embodiments discussed herein. The stator complex comprises the stationary objects within the compressor drum 1, including the fixed shaft 2, the various gas and fluid inlets and outlets, the plurality of eductors 7, and the eductor support rods 8. In an example, as illustrated in FIG. 4, sets of eductors and/or sets of eductors and pitot tubes may be secured to the fixed shaft. Each set of eductors and pitot tubes may attach to a support ring secured to, or a part of, the fixed shaft 2. In various embodiments, each set may comprise a pair of eductors or pitot tubes, and may be positioned such that each eductor/pitot tube pair has a 90° offset around the fixed shaft from a neighboring set. The stator complex may comprise three eductor pairs and a pair of pitot tubes, however more or less eductors and/or pitot tubes may be provided. Each pair of eductors/pitot tubes may also be positioned around the shaft with a 180° separation, as illustrated in FIG. 4. In other examples, each eductor/pitot tube in the set may be separated by equal angles around the shaft and distances between each pair of eductors or pitot tubes may be fixed.

In addition, any of a number of eductors, pitot tubes, and sets of either eductors or pitot tubes, may extend from the fixed shaft in variety of arrangements to optimize gas recovery and efficiency. Arrangements may also depend, for example, on one or more design characteristics including but not limited to size, cost, and manufacturing considerations.

Figure 5:
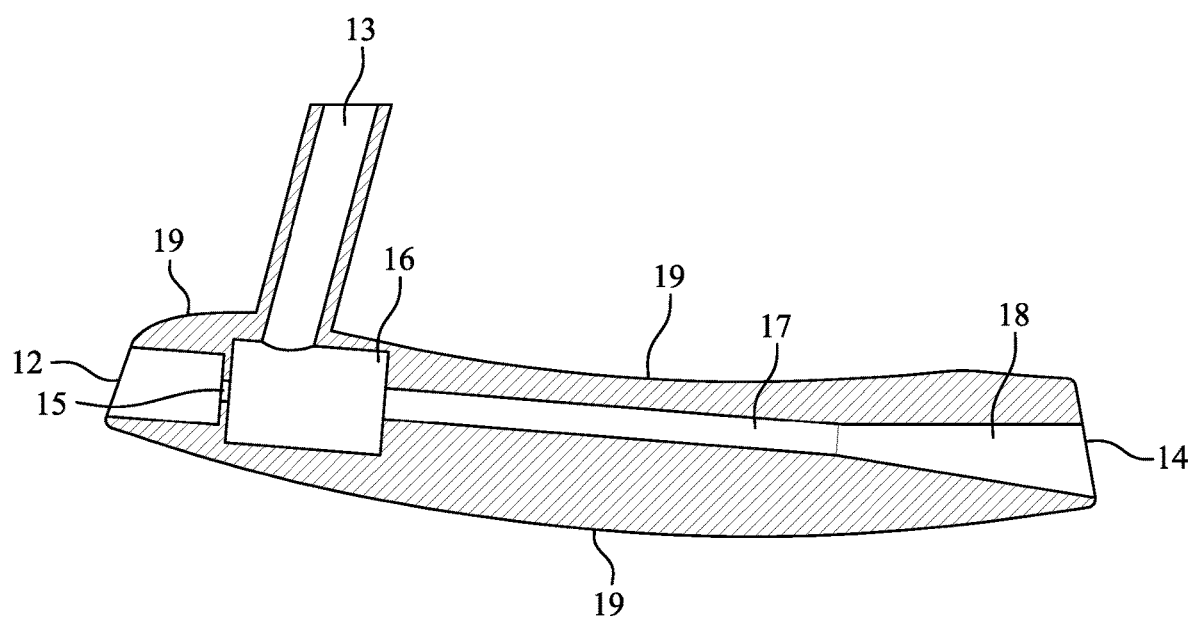
FIG. 5 is cross-sectional view of a non-linear eductor in accordance with an embodiment.

FIG. 5 illustrates a cross-sectional view of a non-linear exterior shaped eductor. A cylindrical compressor drum results in an annular lake being formed along the interior wall. Accordingly, the fluid flow during rotation is circular, and may be optimally received by a non-linear exterior shaped eductor, such as the curved eductor illustrated in FIG. 5, which may still include a linear interior fluid path. Eductors may have a streamlined body 19 such as a curved front end to facilitate fluid flow both through and around the eductor and decrease fluid resistance while traveling through the annular lake. It will be noted, however, that a linear eductor, or other shaped eductor design may be used in accordance with one or more embodiments discussed herein.

With respect to the eductor of FIG. 5, fluid may enter the eductor through a front inlet 12 having a first width. The front inlet 12 may be shaped to match accordingly with the streamlined body 19 at the front end of the eductor, to optimize the fluid flow into the eductor. The fluid flow moves from the front inlet 12 through a nozzle 15 within suction chamber 16. The nozzle 15 has a significantly smaller width than the suction chamber 16, resulting in a pressure drop. In embodiments, the suction chamber may have a same or different width than the front inlet 12. Since the fluid velocity through the entire eductor will remain constant when the compressor drum rotates at a constant speed, the velocity through the narrower nozzle section 15 must be greater than the flow rate through the wider suction chamber 16. Thus, the increase results in a drop in pressure in the nozzle section 15.

Suction chamber 16 utilizes the pressure drop to introduce gas into the system. An eductor suction inlet 13 may be located within the eductor support rod 8 and attached substantially orthogonal to the suction chamber 16, however the position of the eductor support inlet may vary to optimize an amount of gas drawn in. A decrease in pressure from the nozzle creates a suction within the suction chamber 16 and draws gas through the suction inlet 13 from a source external to the compressor drum. In particular, shear forces within the suction chamber 16 cause a momentum transfer from the flowing fluid to the gas and creates a suction. As discussed above, the suction inlet 13 is part of a channel running through the support rod 8 and fixed shaft 2 to introduce gas into the eductors and the compressor drum 1.

After entering the suction chamber 16, the uncompressed gas enters a mixing tube 17, where the gas and fluid mix. In embodiments, as noted above, the mixing tube 17 may have a greater width than the nozzle, be substantially linear, and run along a significant length of the eductor. A divergent section 18 may follow the mixing tube 17. In this region, the gas may be partially compressed due to a pressure increase and interactions with the fluid, which may be an incompressible fluid, such as water. From there the fluid and gas mixture exits the eductor and enters the interior of the compressor drum.

Figure 6:
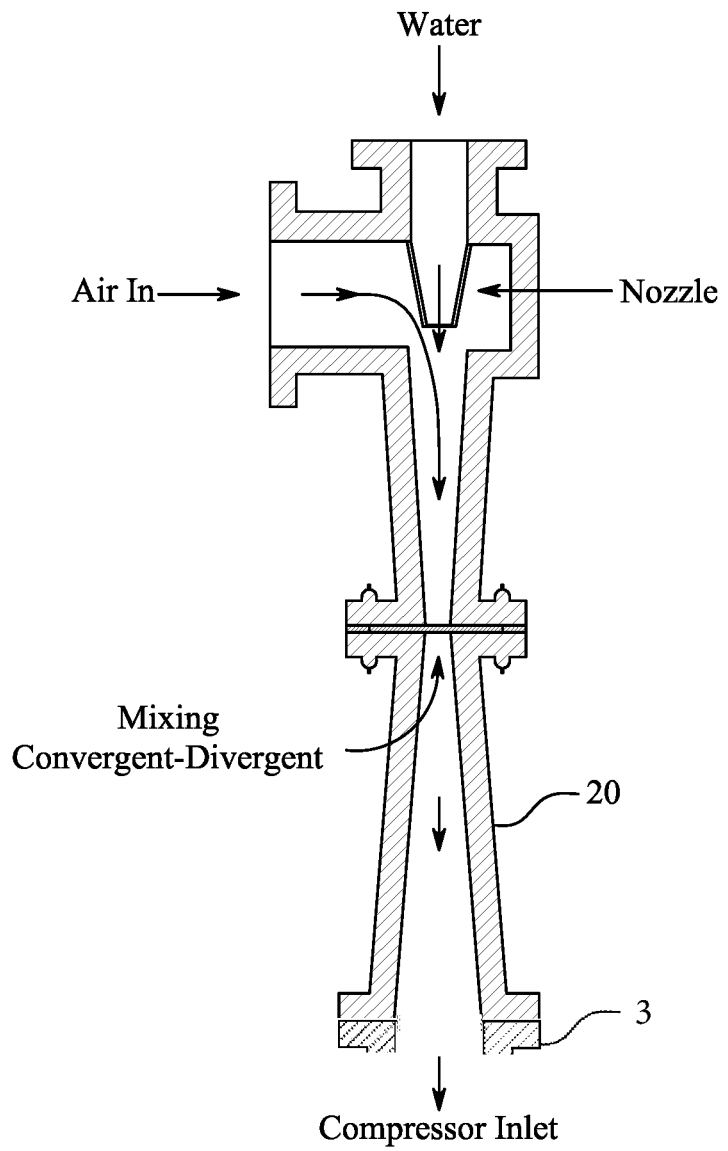
FIG. 6 is a gas inlet eductor in accordance with an embodiment.

FIG. 6 illustrates an additional embodiment wherein an eductor operates as an inlet booster. As discussed above, during compression operations, heated fluid may be removed from the compressor drum, passed through a cooling system, and reintroduced intro the compressor drum. An eductor may be placed at a point of re-entry into the compressor drum, e.g., inlet 3, to increase an amount of gas flow into the compressor drum.

FIG. 6 illustrates an example operation of the inlet booster, with water as the fluid, and air as the gas. Water from a cooling system drives the fluid through the eductor. As discussed above, with reference to FIG. 5, an eductor has a narrowed nozzle section, which creates an orthogonal suction. The suction draws air, e.g., ambient air into the eductor, where it may be mixed with the water in the convergent-divergent section and drawn into the compressor inlet.

An inlet eductor can greatly increase the gas flow into the compressor drum and increase the volume of gas available for compression operations. A greater compressor inlet pressure, for example, results in a greater gas flow and can reduce the work requirement for compression operations within the drum. It will be appreciated that any of plurality of sized eductors, nozzle sizes, etc., may be incorporated to achieve an ideal gas flow according to one or more desired characteristics of the system. In addition, an eductor inlet booster may be advantageous in various compressor systems, including but not limited to cassette systems, eductor-based systems, and other centrifugal compressors.

It will be understood that various aspects or details of the invention(s) may be changed without departing from the scope of the disclosure and invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention(s).

What is claimed:

1. A gas compressor, comprising:
   a substantially hollow cylindrical drum having a first end and a second end opposite the first end, and configured to rotate about a central axis;
   a substantially hollow shaft secured to the first and second ends of the drum;
   an eductor assembly affixed to the shaft, the eductor assembly comprising a plurality of eductors each secured to the shaft by an eductor support rod;
   a first fluid inlet along the shaft, the first fluid inlet creating a channel for a first fluid between an area external to the drum, along the fixed shaft and through each of the eductor support rods to the eductors; and
   at least one gas outlet creating a channel for a gas along an interior of the shaft between a central interior portion of the drum and a gas harvesting system;
   wherein rotation of the drum causes a second fluid within the drum to form an annular lake having a second fluid level, wherein the second fluid from the annular lake is fed into each of the eductors to create a second fluid flow through each of the eductors, wherein the second fluid flow creates a suction drawing the first fluid into each of the eductors through the channel formed by the first fluid inlet, wherein the first fluid is mixed with the second fluid and a gas in the first fluid is partially compressed, wherein the partially compressed gas becomes fully compressed gas as an amount of the partially compressed gas increases within the central interior portion, wherein upon exiting the eductors, the partially compressed gas separates from the mixture of first fluid and the second fluid and accumulates within the central interior portion of the drum, wherein the central interior portion is formed between the annular lake and the substantially hollow shaft when the drum is rotating, and wherein the fully compressed gas is harvested through the gas outlet.

2. The gas compressor of claim 1, wherein each of the eductors are fully submerged in the annular lake when the drum is rotating.

3. The gas compressor of claim 1, wherein the first fluid is a mixture of air and water.

4. The gas compressor of claim 1, further comprising at least one pitot tube configured to remove a volume of the second fluid from the annular lake for cooling outside the drum.

5. The gas compressor of claim 1, wherein each of the eductors further comprise:
an inlet, a suction section comprising a nozzle, a mixture section, and a divergent section, wherein the eductor support rod is connected substantially orthogonally to the suction section.

6. The gas compressor of claim 1, wherein each of the eductors has a non-linear shape.

7. The gas compressor of claim 6, wherein at least one of an internal fluid channel and an external body of each of the eductors is curved to optimize fluid flow.

8. The gas compressor of claim 1, wherein a plane defined by a frontal inlet of each of the eductors is not parallel to the plane defined by the related outlet of the eductor.

9. The gas compressor of claim 1, wherein an external surface of each of the eductors is streamlined to reduce external drag.

10. The gas compressor of claim 1, further comprising at least one pitot tube configured to remove a volume of the second fluid to adjust the second fluid level within the drum.

11. The gas compressor of claim 1, wherein each of the eductors has a second fluid inlet that is at least partially submerged in the annular lake.

12. A gas compression method, comprising:
rotating a substantially hollow cylindrical drum about a central axis, wherein the drum contains a volume of a first fluid and has a first end and a second end opposite the first end, each end secured to a substantially hollow shaft, and wherein an eductor assembly is secured to the substantially hollow shaft, the eductor assembly including an eductor support rod that is affixed to the substantially hollow shaft at a first end and an eductor connected to the eductor support rod at a second end opposite the first end;
forming an annular lake having a first fluid level within the drum and creating a first fluid flow through the eductor from the annular lake, wherein the first fluid flow creates a suction drawing a second fluid external to the drum into the substantially hollow shaft through an inlet to a channel formed through the eductor support rod to the eductor, and wherein the eductor partially compresses a gas in the second fluid;
collecting the partially compressed gas exiting the eductor at a central portion of the drum between the annular lake and the substantially hollow shaft until the partially compressed gas is fully compressed at a desired pressure; and
harvesting the fully compressed gas through a gas outlet.

13. The gas compression method of claim 12, wherein the eductor is fully submerged in the annular lake when the drum is rotating.

14. The gas compression method of claim 12, wherein the second fluid is a mixture of air and water.

15. The gas compression method of claim 12, further comprising removing some of the first fluid in the annular lake from the drum for cooling external to the drum.

16. The gas compression method of claim 12, further comprising providing a gas inlet eductor at the inlet to increase gas flow in the second fluid into the inlet.

17. The gas compression method of claim 12, further comprising managing the first fluid level using one or more pitot tubes within the drum.

18. The gas compression method of claim 12, the eductor includes at least one of a curved fluid channel within the eductor, an eductor inlet and outlet on unparallel planes, and a streamlined eductor body.

19. The gas compressor method of claim 12, wherein the eductor has a first fluid inlet that is at least partially submerged in the annular lake.

20. A gas compressor, comprising:
a substantially hollow cylindrical drum having a first end and a second end opposite the first end, and configured to rotate about a central axis;
a substantially hollow shaft secured to the first and second ends of the drum;
a first fluid inlet configured to receive a first fluid from external to the drum into the shaft;
a gas outlet configured to output a fully compressed gas from within the drum to a gas harvesting system; and
an eductor assembly configured to draw a second fluid from an annular lake formed within the drum between an internal wall of the drum and the shaft, to draw the first fluid from the first fluid inlet, and to partially compress a gas in the first fluid to a first pressure,
wherein rotation of the drum causes the second fluid within the drum to form the annular lake and to form a central portion between the annular lake and the shaft, and wherein introduction of the gas at the first pressure to the central portion causes the gas at the first pressure to be further compressed to a second pressure to form the fully compressed gas.

21. The gas compressor of claim 20, wherein the eductor assembly comprises an eductor and an eductor support rod, wherein the eductor is connected to a first end of the eductor support rod and a second end of the eductor support rod is connected to the hollow shaft, wherein a hollow pathway formed within the eductor support rod supplies the first fluid to the eductor from the hollow shaft.

22. The gas compressor of claim 21, wherein the eductor comprises a body including an inlet for receiving the second fluid from the annular lake, a nozzle for receiving the second fluid from the inlet, a suction chamber from receiving the second fluid from the nozzle and the first from the eductor support rod, a mixing tube for receiving the second fluid and the first fluid from the suction chamber, a divergent chamber for receiving a mixture of the second fluid and the first fluid from the mixing tube, and an exit for receiving the mixture from the divergent chamber and exiting the mixture into the drum.

23. The gas compressor of claim 20, further comprising a gas inlet eductor at the first fluid inlet to increase gas flow in the first fluid into the first fluid inlet.

* * * * *